United States Patent [19]

Okuyama et al.

[11] Patent Number: 6,060,622
[45] Date of Patent: May 9, 2000

[54] METHODS OF REPRODUCING LACTIC ACID COMPONENTS BY USING LACTIC ACID BASED BY-PRODUCTS

[75] Inventors: Hisashi Okuyama, Kyoto; Makoto Ogaito, Nagaokakyo; Tatsushi Kawamoto, Otsu; Takashi Kawabe, Kusatsu; Yasumasa Horibe, Otsu, all of Japan

[73] Assignee: Shimadzu Corporation, Kyoto, Japan

[21] Appl. No.: 08/957,379

[22] Filed: Oct. 24, 1997

[30] Foreign Application Priority Data

Dec. 25, 1996 [JP] Japan .................................. 8-345717

[51] Int. Cl.⁷ ..................................................... C07C 59/08
[52] U.S. Cl. ............................................ 562/589; 560/185
[58] Field of Search ............................. 562/589; 560/185

[56] References Cited

FOREIGN PATENT DOCUMENTS 931512  8/1993  WIPO .

*Primary Examiner*—Paul J. Killos
*Attorney, Agent, or Firm*—Kanesaka & Takeuchi

[57] ABSTRACT

A lactic acid based by-product formed in a process of producing a lactic acid based composition is subjected to racemization in the presence or absence of a catalyst to thereby obtain a lactic acid component having substantially optical inactivity. Then, lactide or polylactic acid having optical inactivity can be obtained from the lactic acid component having the optical inactivity. The obtained lactide or polylactic acid is mixed with lactide or polylactic acid having an optical purity in a range of 90 to 100% e.e. at a predetermined ratio to thereby obtain lactide or polylactic acid having a desired optical purity.

14 Claims, No Drawings

METHODS OF REPRODUCING LACTIC ACID COMPONENTS BY USING LACTIC ACID BASED BY-PRODUCTS

BACKGROUND OF THE INVENTION AND RELATED ART STATEMENT

The present invention relates to methods of reproducing and using by-products formed in a production process of lactic acid based compositions. As the lactic acid based by-products, for example, there are a lactic acid component contained in a condensed liquid, residue and waste liquid from a vacuum pump in a process for synthesizing lactic acid prepolymer or polylactic acid; a residue and waste liquid from a vacuum pump in a process for depolymerizing lactic acid prepolymer to obtain lactide; and waste polymer formed in a process for obtaining polylactic acid by polymerizing a waster mother liquid, waste washing liquid, residue and lactide in a process for refining lactide. Lactic acid components reproduced according to the method of the present invention are used for production of lactic acid, lactide or polylactic acid having a desired optical purity.

Polylactic acid has high safety for organisms, and lactic acid as a decomposed substance thereof is absorbed in vivo. Since polylactic acid is a high molecular compound having high safety for organisms, it has been used for medical purposes, such as a stitching thread for an operation; drug delivery, i.e. time release capsule; and a reinforcing material for fracture of a bone. Since polylactic acid can be decomposed under a natural circumstance, it is also receiving attention as decomposable plastics. Further, polylactic acid has been used for various purposes, such as a uniaxially or biaxially oriented film, fibers, injection molding products or the like.

As methods for producing polylactic acid, there are a direct method, wherein lactic acid is directly dehydrated and condensed to obtain an objective polylactic acid; and a method, wherein cyclic lactide, i.e. dimer, is once synthesized from lactic acid, and then subjected to crystallization or fractionation for refining thereof and then ring-opening polymerization. Methods for synthesizing, refining and polymerizing lactide are disclosed in U.S. Pat. No. 4,057,537; EP Patent Application Publication No. 261,572; chemical literatures, such as Polymer Bulletin, 14, 491–495 (1985); and Makromol. Chem., 187, 1611–1628 (1986). Also, Japanese Patent Publication (KOKOKU) No. 56-14688 discloses that a dyad cyclic diester as an intermediate is polymerized in the presence of tin octylate as a catalyst to produce polylactic acid.

However, in case lactide or polylactic acid is produced by the conventional method, by-products and unnecessary substances as described hereinunder are inevitably produced:

a. a lactic acid component contained in a condensed liquid, waste solvent, residue and waste liquid from a vacuum pump formed in a process where lactic acid prepolymer, polylactic acid or lactide is directly synthesized from lactic acid;

b. a residue and waste liquid from a vacuum pump formed in a process where lactic acid prepolymer is depolymerized to obtain lactide;

c. a waste mother liquid, waste washing liquid and residue formed in a process where lactide is refined;

d. loss in a process where lactide is polymerized to obtain polylactic acid; and e. loss in a process where polylactic acid is subjected to a molding operation.

Also, in case the above mentioned wastes are abandoned, an expense for abandonment increases a cost of the product. Thus, reduction of in the wastes would have great industrial advantages.

Therefore, if the above stated by-products and waste polylactic acid on the market are reused, not only a yield as a whole is increased but also the cost thereof is reduced.

However, when these by-products and waste polylactic acid are reused, there are following problems.

1. In the above a, b and c, the wastes have different optical purities according to processes for obtaining objective products. Also, even if the wastes are formed from the same process, optical purities thereof vary. Therefore, in case these wastes are directly reused, it is difficult to obtain lactic acid, lactide or polylactic acid having a stable optical purity.

2. In case the above d, e or waste polylactic acid is used, a method for obtaining lactide by depolymerization or a method for obtaining lactic acid by hydrolysis may be employed. However, since it is difficult to carry out the depolymerization or hydrolysis under a mild condition, racemization takes place in a process of the depolymerization or hydrolysis, so that lactic acid, lactide or polylactic acid having a stable optical purity can not be obtained.

On the one hand, physical characteristics, such as crystallinity and drawing orientation, of the polylactic acid greatly fluctuate according to the optical purities thereof. Therefore, it is necessary to control the optical purities of polylactic acids to a fixed degree in general use.

Also, optical purities of polylactic acids required on the market vary from 0% e.e. to 100% e.e. Especially, polylactic acids having optical purities of 85% e.e. to 100% e.e. are most required in general use.

The following methods for obtaining polylactic acids having various optical purities are known:

(1) a racemization reaction is controlled by adjusting reaction conditions, i.e. heat history, in a process for synthesizing lactide to obtain lactide having a desired optical purity.

(2) a racemization reaction is controlled by controlling reaction conditions, i.e. heat history, in a process for directly synthesizing polylactic acid from lactic acid without obtaining lactide to obtain polylactic acid having a desired optical purity.

(3) lactide having a high optical purity and lactide having a low optical purity are mixed at a predetermined ratio so that polylactic acid having a desired optical purity can be obtained.

However, methods (1) and (2) require delicate control of the processes, so that products having a stable optical purity can not be obtained. In method (3), DL-lactic acid and DD-lactic acid used for obtaining lactides having a low optical purity are more expensive in cost than LL-lactic acid, so that a cost for obtaining polylactic acid is also increased.

Therefore, an object of the invention is to provide a method for obtaining lactic acid through reproduction of by-products formed in a process for producing lactic acid based compositions.

Another object of the invention is to provide a method for obtaining polylactic acid having a desired optical purity by using the obtained lactic acid.

A further object of the invention is to provide a method for obtaining polylactic acid having a desired optical purity as stated above, wherein polylactic acid having a stable optical purity can be easily obtained at a low cost.

Further objects and advantages of the invention will be apparent from the following description of the invention.

SUMMARY OF THE INVENTION

The present invention is to provide a method for reproducing a lactic acid component by using a lactic acid based by-product, wherein by-products formed in a process for producing a lactic acid based composition are racemized in the presence or absence of a catalyst to thereby obtain the lactic acid component having substantially optical inactivity.

The by-products formed in the production process of the lactic acid based compositions include a lactic acid component contained in a condensed liquid, residue, process washing liquid and waste liquid from a vacuum pump in a process for directly synthesizing a lactic acid prepolymer or polylactic acid; a residue, process washing liquid and waste liquid from a vacuum pump in a process for depolymerizing a lactic acid prepolymer to obtain lactide; a waste liquid, residue and process washing liquid formed in a process for refining lactide; a waste polymer formed in a process for obtaining polylactic acid by polymerizing lactide; and loss in a process of a molding operation of polylactic acid and a waste polymer on the market. However, the by-products are not limited to the above stated examples, and include a sidestream, by-product, waste or the like formed in a production process of lactic acid, lactide, polylactic acid and polylactic acid molding product, which are used as lactic acid as they are or after subjected to hydrolysis.

The racemization is carried out by heating the by-product at a temperature of 80° C.–300° C., preferably 150° C.–250° C. When the temperature is lower than 80° C., the racemization takes too much time. On the other hand, when the temperature is higher than 300° C., by-products, such as acrylic acid, acrylic acid polymer and aldehyde, are produced in a large quantity. The heating may be carried out at an atmospheric pressure, a reduced pressure or an increased pressure. Although heating time is not specifically limited, it is preferable to carry out the racemization for 0.25 to 5 hours.

Also, a catalyst is not essential, and the racemization can be carried out in the absence of the catalyst. More specifically, in case a sufficient amount of an esterification catalyst and polymerization catalyst is contained in a waste itself, these catalysts function as transesterification catalysts. Thus, the racemization can be carried out at a fast speed without further addition of a catalyst. Also, a metal or metal compound belonging to IIIB group, IVA group, IVB group and VA group of the periodic table which is used generally as a polymerization catalyst may remain in polylactic acid. Further, a metal or metal compound belonging to IIIB group, IVA group, IVB group and VA group of the periodic table which is used as a synthesizing catalyst may remain in a residue in a lactide synthesizing process, and in a waste mother liquid or residue in a lactide refining process. Thus, the racemization may be carried out in the absence of a catalyst.

It is also possible to add a catalyst to accelerate the racemization. The catalyst to be used is not restricted to a specific type, and a known or effective catalyst can be used alone or together with other catalysts. As alkaline catalysts, there are hydroxides, oxides and alkoxides of metals belonging to IA group and IIA group of the periodic table, such as lithium hydroxide, sodium hydroxide, potassium hydroxide, magnesium hydroxide, calcium hydroxide, strontium hydroxide, barium hydroxide, lithium oxide, sodium oxide, potassium oxide, magnesium oxide, calcium oxide, strontium oxide, barium oxide, sodium methoxide, potassium methoxide, sodium ethoxide, potassium ethoxide, and silicon oxide. As acid catalysts, there are sulfuric acid, hydrochloric acid, nitric acid, phosphoric acid, toluenesulfonic acid and cation exchange resin. As metals or metal compounds belonging to IIIB group, IVA group, IVB group and VA group, there are, for example, aluminum oxide, aluminum triethoxide, aluminum tripropoxide, aluminum butoxide, aluminum octylate, titanium oxide, tetramethyl titanate, tetrapropyl titanate, tetrabutyl titanate, zirconium oxide, zirconium tetramethoxide, zirconium tetraethoxide, zirconium tetrabuthoxide, zirconium octylate, germanium oxide, metallic tin, tin oxide, tin chloride, tin lactate, tin oxalate, tin dicaprylate, tin dilaurate, tin dipalmitate, tin distearate, dibutyltin dilaurate, dibutyltin oxide, dioctyltin oxide, butyltin chlorooxide, butyltin trichloride, dibutyltin diacetate, dioctyltin dilaurate, butyltin trioctoate, antimony trioxide, antimony triacetate and triphenyl antimony.

Although a quantity of the catalyst to be added is not specifically limited, it is preferable that the quantity be less than 20 parts by weight relative to a solid content. Even if the catalyst is added more than 20 parts by weight, the racemization can not be accelerated further, which results in a high cost.

Incidentally, in case a waste, such as waste polylactic acid, is not a liquid, it is necessary to dissolve the waste by hydrolysis reaction prior to or simultaneously with the racemization. When hydrolysis is carried out, it is preferable to add water more than 15 parts by weight relative to the solid content. In the present invention, it is possible to heat the waste for dissolving at a temperature higher than 170° C. since it is not necessary to prevent the optical purity from being lowered by the racemization. Generally, the waste is heated at a temperature of 80° C. to 300° C., preferably 100° C. to 250° C. However, in case the waste is heated at a temperature higher than 100° C., it is preferable to heat under a pressure higher than an atmospheric pressure to suppress evaporation of water. Although heating time is not specifically limited, it is preferable to dissolve the waste by heating for 0.25 to 5 hours. Also, a catalyst is not necessarily added. The waste can be dissolved in the absence of the catalyst. In case the waste itself contains enough esterification catalyst and polymerization catalyst, these catalysts function as transesterification catalysts. Therefore, the waste can be dissolved at a fast speed without newly adding a catalyst.

It is also possible to add a catalyst for accelerating dissolution of the waste through hydrolysis. A catalyst is not limited to a specific type, and a known or effective catalyst can be used alone or together with other catalysts. The same catalysts as used for the racemization can be used. Although a quantity of the catalyst to be added is not specifically limited, it is preferable to add the catalyst less than 20 parts by weight relative to the solid content.

In addition to the dissolution and racemization processes, in case a waste, such as a waste mother liquid and waste washing liquid formed in a process for refining lactide, contains an organic solvent, it is desirable to add a step for removing the solvent by heating and/or reducing pressure.

A lactic acid component having substantially optical inactivity reproduced according to the present invention means lactic acid and/or lactic acid oligomer having an optical purity of 0 to 5% e.e. Incidentally, the term "optical inactivity" in the present invention means an optical purity in a range of 0 to 5% e.e.

The reproduced lactic acid component having substantially optical inactivity is used for producing lactide having optical inactivity through lactic acid oligomer, or by directly synthesizing the reproduced lactic acid component, which is known already in the art as stated in the background of the invention. Also, polylactic acid having optical inactivity can be obtained through the obtained lactide or by directly polymerizing the lactic acid.

Also, it is possible to obtain lactic acid having a desired optical purity by mixing the reproduced lactic acid having the optical inactivity and lactic acid having an optical purity in a range of 90 to 100% e.e. In the same manner, it is possible to obtain lactide or polylactic acid having a desired optical purity by mixing the produced lactide or polylactic acid having the optical inactivity and lactide or polylactic acid having an optical purity in a range of 90–100% e.e., respectively. Further, it is possible to produce polylactic acid by polymerizing lactic acid or lactide having a desired optical purity.

Incidentally, in case a concentration of desired lactic acid is lower than that of lactic acid obtained from the waste, the concentration of the obtained lactic acid can be raised by dehydrating the obtained lactic acid under an atmospheric pressure or a reduced pressure. In case lactic acid oligomer is intended to be obtained, lactic acid oligomer having a weight average molecular weight of 200 to 50,000 can be synthesized by dehydrating lactic acid obtained from the waste at a temperature of 100° C.–200° C. under a pressure of 0.1–760 Torr.

When lactide is intended to be obtained by depolymerizing lactic acid oligomer, lactic acid oligomer is heated at a temperature of 130° C.–300° C., preferably 160° C.–250° C. When the temperature is lower than 130° C., the depolymerization takes too much time. On the other hand, when the temperature is higher than 300° C., a large quantity of by-products, such as acrylic acid, acrylic acid polymer, aldehyde and the like, are produced. A pressure is preferably less than 100 Torr. Also, in case a quantity of the catalyst contained in lactic acid oligomer is not enough for carrying out the depolymerization, it is preferable to add a catalyst. The catalyst is not limited to a specific type, and a known or effective catalyst can be used alone or together with other catalysts.

As alkaline catalysts, there are metal oxides of IA group and IIA group of the periodic table, such as lithium oxide, sodium oxide, potassium oxide, magnesium oxide, calcium oxide, strontium oxide, barium oxide and silicon oxide; and metals or metal compounds of IIIB group, IVA group, IVB group and VA group, such as aluminum oxide, aluminum triethoxide, aluminum tripropoxide, aluminum butoxide, aluminum octylate, titanium oxide, tetramethyl titanate, tetrapropyl titanate, tetrabutyl titanate, zirconium oxide, zirconium tetramethoxide, zirconium tetraethoxide, zirconium tetrabuthoxide, zirconium octylate, germanium oxide, metal tin, tin oxide, tin chloride, tin lactate, tin oxalate, tin dicaprylate, tin dilaurate, tin dipalmitate, tin distearate, dibutyltin dilaurate, dibutyltin oxide, dioctyltin oxide, butyltin chlorooxide, butyltin trichloride, dibutyltin diacetate, dioctyltin dilaurate, butyltin trioctoate, antimony trioxide, antimony triacetate and triphenyl antimony. However, the catalysts to be used in the invention are not limited to these catalysts. It is preferable to use these catalysts in a quantity less than 20 parts by weight relative to lactic acid oligomer.

A purity of lactide obtained by depolymerizing lactic acid oligomer can be improved, if necessary, by crystallization with a solvent, melt crystallization, sublimation and the like. In case crude lactide having substantially optical inactivity obtained in the present invention is refined, since crude lactide contains LL-lactide, DL-lactide, DD-lactide and lactic acid, and DL-lactide has a higher hydrolyzing property when compared with LL-lactide and DD-lactide, it is possible to separate not only lactic acid but also DL-lactide through refining to obtain more stable lactide. The refining can be carried out by a known method, for example, as disclosed in Japanese Patent Publications (KOKAI) No.7-118259 and No. 6-256340.

Polylactic acid can be obtained from reproduced lactide by a ring-opening polymerization. The ring-opening polymerization is carried out at a temperature of 120° C.–240° C., preferably 140° C.–220° C. Through the polymerization, polylactic acid having an average molecular weight of 50,000 to 300,000 can be obtained. The polymerization can be carried out by using, for example, more than one vertical reactor. Since a viscosity of polymer is ascending in the vertical reactor as the polymerization progresses, it is preferable to use a plurality of reactors having blades corresponding to different viscosities. Also, when a continuous operation is carried out, since a holdup time distribution becomes sharp, it is preferable that the plural reactors are connected in series to increase a heat transfer area per volume. More specifically, first, a reactor having an inclined blade, turbine blade or all face blade is used so that the catalyst can be uniformly mixed in a low viscosity region. Then, a reactor having a blade for a high viscosity, such as a helical ribbon blade, is used. Incidentally, in case a plurality of reactors is used, the respective reactors are not necessarily heated at the same temperature.

As catalysts for the ring-opening polymerization, there are catalysts known for polymerization of lactide, i.e. a tin-based compound, such as tin octylate; a titanium-based compound, such as tetraisopropyl titanate; a zirconium-based compound, such as zirconium isopropoxide; and an antimony-based compound, such as antimony trioxide. Also, a molecular weight of the final polymer can be adjusted by a quantity of the catalyst to be added. A reaction speed becomes slower as the quantity of the catalyst to be added is decreased, but the molecular weight of the polymer becomes higher. Also, a core material, such as talc, clay, titanium oxide, may be added.

Lactide produced according to the present invention can be copolymerized with lactones, such as β-propiolactone, δ-valerolactone, ε-caprolactone, glycoride, δ-butyllactone. Also, physical properties of the lactide produced in the present invention can be controlled by polyalcohol, such as glycerin.

A polymerization reaction varies according to a catalyst to be used. In case tin octylate is used as the catalyst, it is preferable to use 0.0001 to 1.0% by weight, preferably 0.001 to 0.5% by weight, of tin octylate relative to a weight of lactide, and normally to heat the polymerization system for 1.0 to 30 hours to polymerize the same. The polymerization reaction is preferably carried out in an inert gas atmosphere or an inert gas flow of nitrogen or the like.

DETAILED DESCRIPTION OF PREFERRED EMBODIMENTS

The present invention is described hereinbelow based on Examples.

EXAMPLES 1

L-lactic acid in the amount of 1,000 kg, having a lactic acid monomer altered concentration of 90.0% and an optical purity of 98.6% e.e., was supplied to a reaction tank with a condenser of a capacity of 1.2 m$^3$ and capable of distilling under a reduced pressure. L-lactic acid was heated at a temperature of 130° C. for two hours under an atmospheric pressure to distill off 96 kg of a condensed liquid containing lactic acid.

Next, the liquid temperature and pressure were gradually changed from 130° C. to 150° C. and from the atmospheric pressure to 5 Torr for 6 hours to distill off 186 kg of the condensed liquid containing lactic acid and obtain lactic acid oligomer. In the process, 3 kg of an exhaust liquid of a vacuum pump containing lactic acid was obtained. Lactic acid oligomer had a weight average molecular weight of 3,100.

Further, 15.0 kg of tin octylate was added to the reaction tank, and the reaction tank was heated at a temperature of 190° C. under a pressure of 5 Torr for three hours to distill off 712 kg of crude lactide. In the process, 12 kg of a residue was obtained in the reaction tank.

Toluene in the amount of 399 kg and tetrahydrofuran in the amount of 171 kg were added to the crude lactide and heated at a temperature of 65° C. to dissolve the same. Then, the solution was cooled down to 5° C. to separate crystals of lactide through filtration. Further, the filtrated crystals were washed by a mixture of 399 kg of toluene and 171 kg of tetrahydrofuran at 5° C., and dried under a reduced pressure to obtain 603 kg of refined lactide. The refined lactide had an optical purity of 99.7% e.e. In the process, also, 1,249 kg of a waste mother liquid and a waste washing liquid was obtained. The waste mother liquid and waste washing liquid were condensed in an evaporator to obtain 103 kg of a residue.

A mixture of the above obtained condensed liquid, the vacuum pump exhaust liquid and the residue was supplied to a reaction tank with a condenser in a capacity of 0.6 m$^3$ and capable of distilling under a reduced pressure, and heated at 130° C. for two hours under an atmospheric pressure to dissolve the contents in the tank and distill off the condensed liquid to obtain a concentration of 90.1% in a lactic acid altered concentration.

Next, the liquid temperature and pressure were gradually changed from 130° C. to 160° C. and from the atmospheric pressure to 5 Torr for three hours to distill off the condensed liquid. Further, the reaction tank was heated for eight hours at a temperature of 230° C. under an atmospheric pressure to obtain lactic acid oligomer having substantially optical inactivity, i.e. optical purity of 0.4% e.e., and a weight average molecular weight of 3,440.

Then, 3.0 kg of tin octylate was added to the reaction tank and heated for one hour at a temperature of 200° C. under a pressure of 5 Torr to distill off 110 kg of crude lactide.

Next, 61.6 kg of toluene and 26.4 kg of tetrahydrofuran were added to the above obtained crude lactide, and heated at 65° C. to dissolve. Then, the solution was cooled down to 5° C. to separate crystals of lactide through filtration. Further, the filtrated crystals were washed with a mixture of 61.6 kg of toluene and 26.4 kg of tetrahydrofuran at 5° C., and dried under a reduced pressure to obtain 71 kg of refined lactide. The refined lactide had an optical purity of 0.0% e.e.

A yield of the above obtained total refined lactide relative to a theoretical yield was 93.6%.

The above refined lactides having optical purities of 99.7% e.e. and 0.0% e.e. were mixed at a weight ratio of 85.3:14.7. The mixture was continuously supplied to a biaxial extruder together with 0.10 parts by weight of tin octylate relative to the lactides, for heating and mixing to obtain polylactic acid.

Thus obtained polylactic acid had an optical purity of 84.6% e.e.; a weight average molecular weight of 183,000; a glass transition point of 59.7° C.; a tensile strength of 6,270 psi; a tensile elastic modulus of 490 kpsi; and a tensile ductility of 6.2%, which is suitable as a film material.

Incidentally, a concentration of lactic acid was measured by a liquid chromatography using a column, wherein silica gel modified by an octadecyl group after hydrolysis was used as a filler.

The optical purity was measured by a liquid chromatography using an optical resolution column, wherein silica gel modified by an L-amino acid derivative after hydrolysis was used as a filler.

Molecular weight of lactic acid prepolymer was obtained by measuring a weight average molecular weight of GPC, wherein polystyrene was used as a reference material.

EXAMPLE 2

L-lactic acid in the amount of 1,000 kg, having a lactic acid monomer altered concentration of 90.2% and an optical purity of 98.5% e.e., was supplied to a reaction tank with a condenser of a capacity of 1.2 m$^3$ and capable of distilling under a reduced pressure. L-lactic acid was heated at temperature of 130° C. for two hours under an atmospheric pressure to distill off 95 kg of a condensed liquid containing lactic acid.

Next, the temperature and pressure were gradually changed from 130° C. to 150° C. and from the atmospheric pressure to 5 Torr for 6 hours to distill off 187 kg of a condensed liquid containing lactic acid to thereby obtain lactic acid oligomer. In the process, 3 kg of an exhaust liquid from a vacuum pump was obtained. Lactic acid oligomer had a weight average molecular weight of 3,200.

Further, 15.0 kg of tin octylate was added to the reaction tank, and the reaction tank was heated at a temperature of 190° C. under a pressure of 5 Torr for three hours to distill off 713 kg of crude lactide. In the process, 12 kg of a residue was obtained in the reaction tank.

Next, 399 kg of toluene and 171 kg of tetrahydrofuran were added to the crude lactide and heated at a temperature of 65° C. to dissolve the same. Then, the solution was cooled down to 5° C. to separate crystals of lactide through filtration. Further, the filtrated crystals were washed by a mixture of 399 kg of toluene and 171 kg of tetrahydrofuran at 5° C., and dried under a reduced pressure to obtain 604 kg of refined lactide. Refined lactide had an optical purity of 99.6% e.e. In the process, 1,247 kg of a waste mother liquid and a waste washing liquid was obtained. The waste mother liquid and waste washing liquid were condensed in an evaporator to obtain 104 kg of a residue.

A mixture of the above obtained condensed liquid, the vacuum pump exhaust liquid, the residue and 20 kg of waste strand of polylactic acid having a weight average molecular weight of 193,000 was supplied to a reaction tank with a condenser of 0.6 m$^3$ and capable of distilling under a reduced pressure, and heated at 130° C. for two hours under an atmospheric pressure to dissolve the contents in the reaction tank and distill the condensed liquid to obtain a concentration of 90.0% in a lactic acid altered concentration. Next, the temperature and pressure were gradually changed for three hours from 130° C. to 160° C. and from the atmospheric pressure to 5 Torr to distill off the condensed liquid. Further, 3.0 kg of tin octylate was added to the reaction tank, and heated for eight hours at a temperature of 230° C. under the atmospheric pressure to obtain lactic acid oligomer having substantially optical inactivity, i.e. optical purity of 0.3% e.e., and a weight average molecular weight of 3,570.

Then, the reaction tank was heated for one hour at a temperature of 200° C. under a pressure of 5 Torr to distill off 132 kg of crude lactide. Toluene in the amount of 73.9 kg and tetrahydrofuran in the amount of 31.7 kg were added to the above obtained crude lactide, and heated at 65° C. to solve the same. Then, the solution was cooled down to 5° C. to crystalize lactide and separate the crystallized lactide through filtration. Further, the filtrated crystals were washed with a mixture of 73.9 kg of toluene and 31.7 kg of tetrahydrofuran at 5° C., and dried under a reduced pressure to obtain 85 kg of refined lactide. Refined lactide had an optical purity of 0.0% e.e.

The above refined lactides having the optical purities of 99.6% e.e. and 0.0% e.e. were mixed at a weight ratio of 94.4:5.6. The mixture was continuously supplied to a biaxial extruder together with 0.10 parts by weight of tin octylate relative to the lactides to heat and mix together to thereby obtain polylactic acid.

Thus obtained polylactic acid had an optical purity of 93.7% e.e.; a weight average molecular weight of 146,000; a glass transition point of 59.7° C.; a melting point of 161.6° C.; a tensile strength of 7,720 psi; a tensile elastic modulus of 510 kpsi; and a tensile ductility of 4.3%, which is suitable as a material for injection molding products.

Comparative Example 1

L-lactic acid in the amount of 1,000 kg, having a lactic acid monomer altered concentration of 90.0% and an optical purity of 98.6% e.e., was supplied to a reaction tank with a condenser of a capacity of 1.2 m³ and capable of distilling under a reduced pressure. L-lactic acid was heated at temperature of 130° C. for two hours under an atmospheric pressure to distill off 96 kg of a condensed liquid containing lactic acid.

Next, the temperature and pressure were changed gradually from 130° C. to 150° C. and from the atmospheric pressure to a pressure of 5 Torr for 6 hours to distill off 186 kg of a condensed liquid containing lactic acid and obtain lactic acid oligomer. Lactic acid oligomer had a weight average molecular weight of 3,100.

Further, 15.0 kg of tin octylate was added to the reaction tank, and the reaction tank was heated at a temperature of 190° C. under a pressure of 5 Torr for three hours to distill off 712 kg of crude lactide.

Toluene in the amount of 399 kg and tetrahydrofuran in the amount of 171 kg were added to the crude lactide, and the mixture was heated to a temperature of 65° C. to dissolve the same. Then, the solution was cooled down to 5° C. to separate crystallized lactide through filtration. Further, the filtrated crystals were washed by a mixture of 399 kg of toluene and 171 kg of tetrahydrofuran at 5° C., and dried under a reduced pressure to obtain 603 kg of refined lactide. Refined lactide had an optical purity of 99.7% e.e.

A yield of the above obtained refined lactide relative to a theoretical yield is 83.8%.

According to the method of the present invention, lactic acid can be obtained by reproducing the by-products formed in a production process of lactic acid based compositions. Also, lactide and polylactic acid having a desired optical purity can be obtained by using reproduced lactic acid.

While the invention has been explained with reference to the specific examples of the invention, the explanation is illustrative, and the invention is limited only by the appended claims.

What is claimed is:

1. A method for reproducing and using a lactic acid based by-product, comprising:
   obtaining a lactic acid based by-product formed in a process of producing a lactic acid based composition; and
   racemizing the lactic acid based by-product to form a lactic acid component having substantially optical inactivity.

2. A method for reproducing and using a lactic acid based by-product as claimed in claim 1, wherein said by-product is obtained by at least one process selected from a group consisting of directly synthesizing lactic acid prepolymer; directly synthesizing polylactic acid; depolymerizing lactic acid prepolymer to obtain lactide; directly synthesizing lactide from lactic acid; refining lactide; polymerizing lactide to obtain polylactic acid; and waste polymer on the market.

3. A method for reproducing and using a lactic acid based by-product as claimed in claim 1, wherein said racemization of the by-product is carried out after or simultaneously with hydrolysis of the by-product.

4. A method for reproducing and using a lactic acid based by-product as claimed in claim 1, wherein said racemization is carried out by heating the by-product at a temperature in a range of 80° C. to 300° C.

5. A method for reproducing and using a lactic acid based by-product as claimed in claim 1, further comprising reacting the lactic acid component having substantially optical inactivity obtained by the method of claim 1 to form lactide having optical inactivity.

6. A method for producing and using a lactic acid based by-product as claimed in claim 5, wherein the lactide is polymerized to form polylactic acid having an optical inactivity.

7. A method for producing and using a lactic acid based by-product as claimed in claim 1, further comprising directly polymerizing the lactic acid component having substantially optical inactivity obtained by the method of claim 1 to form polylactic acid having optical inactivity.

8. A method for producing and using a lactic acid based by-product as claimed in claim 1, wherein the lactic acid component having substantially optical inactivity obtained by the method of claim 1 is mixed with lactic acid having an optical purity of 90–100% e.e. to thereby obtain lactic acid having a desired optical purity.

9. A method for producing and using a lactic acid based by-product as claimed in claim 8, wherein the lactic acid having the desired optical purity is directly polymerized to obtain polylactic acid.

10. A method for producing and using a lactic acid based by-product as claimed in claim 5, wherein the lactide having optical inactivity obtained by the method of claim 5 is mixed with lactide having an optical purity of 90–100% e.e. to thereby obtain lactide having a desired optical purity.

11. A method for producing and using a lactic acid based by-product as claimed in claim 10, wherein the lactide as claimed in claim 10 is polymerized to obtain polylactic acid.

12. A method for producing and using a lactic acid based by-product as claimed in claim 6, wherein the polylactic acid having optical inactivity obtained according to claim 6 is mixed with polylactic acid having an optical purity of 90 to 100% e.e. to obtain polylactic acid having a desired optical purity.

13. A method for producing and using a lactic acid based by-product as claimed in claim 7, wherein the polylactic acid having optical inactivity obtained according to claim 7 is mixed with polylactic acid having an optical purity of 90 to 100% e.e. to obtain polylactic acid having a desired optical purity.

14. A method for producing and using a lactic acid based by-product as claimed in claim 1, wherein said lactic acid based by-product contains lactic acid components with various optical purities.

* * * * *